# United States Patent Office 3,703,486
Patented Nov. 21, 1972

3,703,486
PROCESS FOR FOAMING ORGANIC LIQUIDS
Joseph W. Keil, Midland, Mich., assignor to Dow Corning Corporation, Midland, Mich.
No Drawing. Application Apr. 28, 1965, Ser. No. 451,617, now Patent No. 3,511,788, dated May 12, 1970, which is a continuation of abandoned application Ser. No. 430,193, Feb. 3, 1965, which in turn is a continuation-in-part of abandoned application Ser. No. 319,512, Oct. 28, 1963. Divided and this application Aug. 27, 1969, Ser. No. 853,497
Int. Cl. C08c 17/08
U.S. Cl. 260—2.5 AA    10 Claims

ABSTRACT OF THE DISCLOSURE

A process is disclosed for preparing a foam which comprises adding at least 0.1% by weight of a copolymer consisting essentially of $SiO_2$ units and units selected from the group consisting of $(CH_3)_3SiO_{1/2}$ and $Q(CH_3)_2CiO_{1/2}$ units, wherein Q is a radical containing a solubilizing group that makes the copolymer compatible with the material to which it is added, and the ratio of $SiO_2$ units to the total ($CH_3Si$ and $Q(CH_3)_2Si$ units is in the range of 1:0.6 to 1:1.2, to an organic liquid having a surface tension of at least 22.2 dynes per centimeter at 20° C. when in contact with air, and then expanding said liquid with a gas.

---

This invention relates to foams, compositions for making foams, a method for making foams and foam covered substrates.

This application is a division of application Ser. No. 451,617, now U.S. Pat. No. 3,511,788, filed Apr. 28, 1965, which application is a continuation of abandoned application Ser. No. 430,193, filed Feb. 3, 1965, and entitled "Foams, Compositions, Method for Making Foams and Foam Covered Substrate," which in turn is a continuation-in-part of abandoned application Ser. No. 319,512, filed Oct. 28, 1963 and entitled "Foams and Compositions and Method for Making Foams and now abandoned.

More particularly this invention relates to compositions for making foams comprising (1) organic liquids having a surface tension of at least 22.2 dynes per centimeter at 20° C. when in contact with air, and (2) a copolymer of $SiO_2$ units and units selected from the group consisting of $(CH_3)_3SiO_{1/2}$ and $Q(CH_3)_2SiO_{1/2}$ units, wherein Q is a radical containing a solubilizing group and the ratio of $SiO_2$ units to the total $(CH_3)_3Si$- and $Q(CH_3)_2Si$- units is in the range of 1:0.6 to 1:1.2, said copolymer being compatible with said organic liquid and being present in a foam forming amount.

The method of this invention for making the foams comprises expanding the composition defined above with a gas.

This invention also relates to the foams which are made from the compositions and by the method set forth above.

This invention further relates to a process of preparing a foam which comprises adding to an organic liquid having a surface tension of at least 22.2 dynes per centimeter at 20° C. when in contact with air, a copolymer of $SiO_2$ units and units selected from the group consisting of $(CH_3)_3SiO_{1/2}$ and $Q(CH_3)_2SiO_{1/2}$ units, wherein Q is a radical containing a solubilizing group and the ratio of $SiO_2$ units to the total $(CH_3)_3Si$ and $Q(CH_3)_2Si$ units is in the range of 1:0.6 to 1:1.2 in a foam forming amount, said copolymer being compatible with said organic liquid and then expanding said organic liquid with a gas.

The invention still further relates to a substrate, and particularly a paper, coated with about 1 to 10 mils of a cured, open-celled foam. So far as is known, heretofore no one has been able to apply such a thin layer of an open-celled foam to paper. A particularly unique, and sometimes very important, characteristic of the foams applied to the substrates is that they can be made open-celled at the surface (e.g. porous) as well as being open-celled internally. However, it is also possible to make open-celled foams in accordance with this invention which have a surface skin.

The compositions and methods of this invention are useful for preparing foams which in turn have numerous uses. For example, foams from the organic liquids are useful as solvent cleaners and applying a thin layer of solvent over a large area.

The substrates, and particularly paper, coated with the foams of this invention find numerous uses. For example, such articles of manufacture are useful as non-slip napkins, bed sheets, cleaning towels and magazine paper (which can be printed or screened) where an increased bulk but essentially no increase in weight is desired. These articles are also useful as filters for cigarettes, automobile air filters, air-conditioning systems (both heating and cooling) in homes and industry, fuel filters and broadly for almost any gas or liquid. The coated substrates can also be used in packaging as a cushioning and/or insulation material. They can further be used as fabric liners and as fillers between fabrics.

The foam on the substrate can be employed as a carrier for other materials such as antiseptics or medicinals, burn ointments, detergents and microencapsulated ink which articles would be useful as bandages, burn dressings, cleaning towels or pads, and carbonless carbon paper respectively. These uses are illustrative of those wherein an open-celled surface on the foam can be very important or even essential. The term "microencapsulated ink" is intended to include a colored ink per se which has been incorporated in or "encapsulated" by the foam as well as colorless dyes or chemicals which are developed into a colored material when brought in contact with the proper reactant. The ink or dye can alternatively be incorporated or encapsulated prior to its addition into the foam if so desired. The latter types of carbonless carbon papers, without the foam, are known and are described for example in U.S. Pats. 2,548,366; 2,800,457; and 2,800,458.

Other uses of the compositions, foams and coated substrates of this invention will be obvious to those skilled in the art.

The process of this invention is also useful in air drilling and hydrocarbon liquid removal from gas wells.

Any substrate can be covered or coated with the foams made in accordance with this invention. Thus, for example, the substrate can be metal, glass, fabric (woven or non-woven), wood, plastic, paper, porcelain or ceramic. The substrate can be porous or non-porous in nature and the term "coated" as employed herein is intended to include the impregnation of a material per se or in conjunction with a surface coating as well as surface coating per se.

The copolymers employed in this invention are well-known materials. They can be prepared by the cohydrolysis of $(CH_3)_3SiX$ and/or $Q(CH_3)_2SiX$ with $SiX_4$, wherein X is a hydrolyzable radical such as a halogen (chlorine, fluorine, bromine) or an alkoxy (methoxy, ethoxy, propoxy, butoxy, etc.) radical, employing, of course, such proportions as are necessary to obtain the desired $SiO_2$ to total $(CH_3)_3Si$ and $Q(CH_3)_2Si$ ratio of 1:0.6 to 1:1.2. Alternatively, a copolymer can be prepared, for example, by reacting $(CH_3)_3SiCl$,

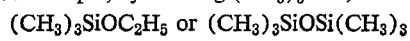
$(CH_3)_3SiOC_2H_5$ or $(CH_3)_3SiOSi(CH_3)_3$ with an acidic silica sol. Such a method is fully described in U.S. Pat. 2,676,182, the disclosure of said patent being incorporated herein by reference.

A particularly useful means for preparing modified copolymers containing both $(CH_3)_3SiO_{1/2}$ and $Q(CH_3)_2SiO_{1/2}$ units comprises cohydrolyzing a mixture of $(CH_3)_3SiX$ and $H(CH_3)_2SiX$ with $SiX_4$ and then coupling the desired solubilizing group Q to the copolymer by reacting the hydrogen on the silicon with the unsaturated group of a compound that also contains the desired solubilizing group. This type of reaction is well known in the art and is illustrated in the examples. The purpose of the solubilizing group in the radical Q is to make the copolymer compatible with organic liquids which it might not be compatible with otherwise. Any solubilizing group can be employed in the copolymers of this invention, the particular organic liquid in which the copolymer is to be placed determining the choice of solubilizing group. Examples of solubilizing groups that can be employed in the Q radical are the carboxyl, ester, amide, amino, mercapto, halohydrocarbon, nitrile, nitro, carbonyl and higher hydrocarbon groups.

The essential characteristics of the copolymer (2) as defined above are the siloxane units present, the ratio of these siloxane units and the compatibility of the copolymer with the organic liquid or plastisol. By being "compatible" it is meant that the copolymer is at least partially soluble and/or dispersible in the organic liquid. The copolymer can also be completely soluble or dispersible in the organic liquid. So far as is known at this time, it is believed that when one wants the most stable foam the copolymer is preferably only partially soluble or dispersible rather than completely so. The compatibility of the copolymer in a particular system, can be controlled in several ways. By way of illustration, one can choose a particular copolymer within the above definition which has the desired degree of compatibility. Another alternative is to alter the copolymer by the Q radical present and thus control the degree of compatibility. Thus it can be seen from the foregoing illustrations that the instant invention has a maximum amount of flexibility which permits tailoring the compositions and products made therefrom to individual specifications and needs rather than vice versa.

The amount of copolymer used need only be sufficient to cause foaming and can vary from one medium to another. The amount will also vary depending on the particular application. The copolymer can be used in any amounts from a trace amount to quite large amounts but is preferably used in an amount from 0.1 to 4% by weight based on the weight of the organic liquid. More than 4% can be used but is not preferred for economic reasons.

The copolymer can be used to foam any non-silicone organic liquid having a surface tension of at least 22.2 dynes per centimeter at 20° C. when in contact with air and with which it is compatible. The term "non-silicone organic liquid" as used herein includes any simple or complex liquid reaction products, such as liquid epoxy resins, as well as pure compounds and mixtures of compounds as long as they have the specified surface tension. Illustrative of the non-silicone organic liquids that can be foamed are acetic acid, formic acid, n-butyric acid, isobutyric acid, oleic acid, o-xylene, benzene, cyclohexane, toluene, methyl benzoate, methyl acetate, ethyl nitrate, ethyl formate, ethyl acetate, ethyl acetoacetate, ethyl cinnamate, methyl propionate, methyl formate, n-propyl acetate, ethylene glycol, glycerol, benzyl alcohol, ethyl alcohol, n-octyl alcohol, phenol, allyl alcohol, n-butyl alcohol, bromoform, chloroform, bromobenzene, chlorobenzene, carbon tetrachloride, ethylene chloride, methylene chloride, methylene iodide, tetrabromoethane, ethylene oxide, methylethylketone, acetone, benzophenone, quinoline, N-methylaniline, ethylaniline, dimethylaniline, n-propylamine, benzylamine, pyridine, o-toluidine, triphenyl-phosphine, tristearin, allyl isothiocyanate, diethylcarbonate, ethyl mercaptan, benzonitrile, nitroethane, nitrobenzene, paraldehyde, benzaldehyde and furfural.

The particular method by which the organic liquid containing the copolymer is expanded with a gas will depend on available equipment and individual preferences. The numerous ways in which gas is incorporated into materials to foam them are well known in the art. These ways include, for example, the chemicals which release a gas under the desired conditions and called blowing agents in the art; bubbling a gas into the material; and mechanically beating air or another gas into the material. Of course combinations of these methods can also be employed.

Any gas can be used to expand the organic liquids so long as it produces no undesirable effects on the resulting or desired product.

In order that those skilled in the art can better understand how the present invention can be practiced, the following examples are given by way of illustration and not by way of limitation.

EXAMPLE 1

In four separate bottles 30 g. of isopropyl alcohol, octane, methyl alcohol and nonane were placed. These liquids have surface tensions of 21.7, 21.8, 22.6 and 22.9 dynes per centimeter respectively at 20° C. when in contact with air. To each of these liquids 0.35 g. of a copolymer of $SiO_2$ and $(CH_3)_3SiO_{1/2}$ in which the ratio of $SiO_2$ units to $(CH_3)_3Si$ units was in the range of 1:0.6 to 1:1.2 was added. Each of the bottles was then vigorously shaken. Neither the isopropyl alcohol or octane foamed whereas both the methyl alcohol and nonane did foam. This example shows that organic liquids having surface tensions of less than 22.2 dynes per centimeter are not foamed by the copolymer but organic liquids having a surface tension of at least 22.2 dynes per centimeter are foamed by the copolymer.

EXAMPLE 2

200 g. of kerosene was placed in each of two 1,000 ml. graduates. To the first graduate a copolymer of $SiO_2$ and $(CH_3)_3SiO_{1/2}$ in which the ratio of $SiO_2$ units to $(CH_3)_3Si$ units was in the range of 1:0.6 to 1:1.2 was added. To the second graduate a copolymer identical to the other was added except that it had ben treated with $(CH_3)_3SiCl$. The treatment consisted of adding 1.25% of $(CH_3)_3SiCl$ to a solution of the copolymer in xylene (60% solids). The mixture was refluxed for about 4 hours and then cooled. Another 1.25% of $(CH_3)_3SiCl$ was added to the mixture, then it was refluxed for about 6 hours and again cooled. The mixture was then heated to reflux again and then the xylene was distilled off at 143° C. Finally, 100 cc. of xylene was added to the product and the mixture heated to 143° C. to distill off the xylene. There was 0.1% silicone solids added to each of the graduates. A diffusion stone was placed in the bottom of the graduates and nitrogen bubbled through it at the rate of about 120 ml. per minute. In the first graduate, after 5 minutes of bubbling, 39 ml. of the kerosene had been converted to foam. The foam had a volume of 424 ml. In the second graduate containing the treated copolymer, after 5 minutes of bubbling, 56 ml. of the kerosene had been converted to foam. The foam had a volume of 571 ml.

EXAMPLE 3

A one-shot foam was made by first mixing 7.5 g. of refined tall oil, 2.5 g. of N,N,N',N'-tetrakis(2-hydroxypropyl)ethylenediamine and 2.5 g. of trichlorofluoromethane and then adding 7 g. of $OCNC_6H_4CH_2C_6H_4NCO$. The mixture was poured into a bottle and a foam 2⅝ inches in height obtained. The foam contained numerous open and large cells on the top and sides. Another one-shot foam identical to the first was prepared except that 0.2 g. of a 10% (solids) solution in xylene of a copolymer of $SiO_2$ and $(CH_3)_3SiO_{1/2}$ in which the ratio of $SiO_2$ units and $(CH_3)_3Si$ units was in the range of 1:0.6 to 1:1.2 was also mixed with the first three ingredients prior to the addition of the isocyanate. When this mixture was poured into a bottle identical to the first one a foam having a height of 3 1/16 inches was obtained. This foam has cells which were uniform in size.

EXAMPLE 4

Two mixtures were prepared. The first mixture consisted of 10 grams of a low molecular weight liquid epoxy resin prepared by the reaction of bisphenol A and epichlorohydrin [1] and 10 drops of a solution in xylene (50% solids) of a copolymer of $SiO_2$ and $(CH_3)_3SiO_{1/2}$ units in which the ratio of $SiO_2$ units to $(CH_3)_3Si$ units was in the range of 1:0.6 to 1:1.2. The second mixture consisted of 10 grams of the same resin and 10 drops of a solution in xylene (50% solids) of a copolymer of $SiO_2$,

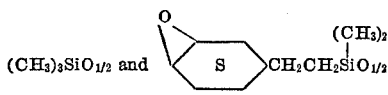

units in which the ratio of $SiO_2$ units to total

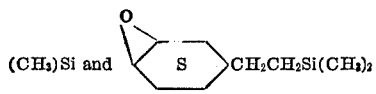

units was in the range of 1:0.6 to 1:1.2. This copolymer was prepared as follows: In a one liter, three-necked flask equipped with stirrer, plug and Dean Stark trap, there was placed 18.5 grams (.15 mol) of vinylcyclohexene oxide, 168.8 grams of a copolymer of $SiO_2$, $(CH_3)_3SiO_{1/2}$ and $H(CH_3)_2SiO_{1/2}$ units in which the ratio of the $SiO_2$ units to total $(CH_3)_3Si$ and $H(CH_3)_2Si$ units was in the range 1:0.6 to 1:1.2, 52 grams of xylene, 30 ml. of xylene for the Dean Stark trap and 4 drops of a 1.26% solution of platinum (as chloroplatinic acid) in ethanol. The mixture was heated for 24 hours at xylene reflux (approximately 142° C.) and then filtered.

Both of the epoxy resin copolymer mixtures were heated to 60° C. and then foamed with air from a fritted-glass gas dispersion tube. The foam formed in the first mixture broke down to the surface immediately when the air flow was stopped whereas the foam formed in the second mixture containing the modified copolymer took 60 seconds to break down to the surface when the air flow was stopped.

[1] The resin had a viscosity of 11,000-16,000 centipoises, an epoxide equivalent weight of 187-193, a specific gravity of 1.17 and a surface tension of 50 dynes per centimeter.

That which is claimed is:

1. A process for preparing a foam which comprises adding 0.1 to 4% by weight of a copolymer consisting essentially of $SiO_2$ units and units selected from the group consisting of $(CH_3)_3SiO_{1/2}$ and $Q(CH_3)_2SiO_{1/2}$ units, wherein Q is a radical containing a solubilizing group that makes the copolymer compatible with the material to which it is added, and the ratio of $SiO_2$ units to the total $(CH_3)_3Si$ and $Q(CH_3)_2Si$ units is in the range of 1:0.6 to 1:1.2, to a non-silicone organic liquid having a surface tension of at least 22.2 dynes per centimeter at 20° C. when in contact with air, and then expanding said liquid with a gas.

2. The process of claim 1 wherein the copolymer consists essentially of $SiO_2$ and $(CH_3)_3SiO_{1/2}$ units.

3. The process of claim 2 wherein the liquid is a hydrocarbon.

4. The process of claim 3 wherein the liquid is nonane.

5. The process of claim 3 wherein the liquid is kerosene.

6. The process of claim 2 wherein the liquid is methyl alcohol.

7. The process of claim 2 wherein the liquid is a polyurethane.

8. The process of claim 1 wherein the copolymer consists essentially of $SiO_2$, $(CH_3)_3SiO_{1/2}$ and $Q(CH_3)_2SiO_{1/2}$ units.

9. The process of claim 8 wherein the liquid is an epoxy resin.

10. The process of claim 9 wherein Q is

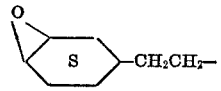

References Cited

UNITED STATES PATENTS

| | | | |
|---|---|---|---|
| 3,271,332 | 9/1966 | Bond et al. | 260—2.5 |
| 3,397,158 | 8/1968 | Britain et al. | 260—2.5 |

FOREIGN PATENTS

| | | | |
|---|---|---|---|
| 1,423,704 | 11/1965 | France | 260—2.5 |

OTHER REFERENCES

Saunders et al.: Polyurethanes, Part II, pp. 7, 44–45, 68–69, 219–220 cited.

Hackh's Chemical Dictionary, 3rd Edition, McGraw-Hill Book Co., Inc., N.Y., 1944.

Encyclopedia of Chemical Technology, 2nd ed. revised, 18, 221–3, 1969.

DONALD E. CZAJA, Primary Examiner

M. J. MARQUIS, Assistant Examiner

U.S. Cl. X.R.

117—124 F, 135.1, 138.8, 148; 252—307; 260—2.5 R, 2.5 EP, 2.5 S, 824 EP